United States Patent
Woo

(10) Patent No.: US 9,440,864 B2
(45) Date of Patent: Sep. 13, 2016

(54) DISSOLVED AIR FLOTATION-TYPE PRETREATMENT APPARATUS

(75) Inventor: Sung Woo Woo, Seongnam-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 133 days.

(21) Appl. No.: 14/007,406

(22) PCT Filed: Mar. 25, 2011

(86) PCT No.: PCT/KR2011/002068
§ 371 (c)(1),
(2), (4) Date: Sep. 25, 2013

(87) PCT Pub. No.: WO2012/133957
PCT Pub. Date: Oct. 4, 2012

(65) Prior Publication Data
US 2014/0014562 A1 Jan. 16, 2014

(51) Int. Cl.
*C02F 1/24* (2006.01)
*C02F 1/00* (2006.01)
(Continued)

(52) U.S. Cl.
CPC . *C02F 1/24* (2013.01); *B03D 1/14* (2013.01); *B03D 1/1431* (2013.01); *B03D 1/1475* (2013.01); *C02F 1/001* (2013.01);
(Continued)

(58) Field of Classification Search
CPC ............ C02F 1/24; C02F 1/001; C02F 1/52; C02F 3/085; C02F 3/104; C02F 2103/08; C02F 2303/16; B03C 1/1431; B03C 1/1462; B03C 1/1475; B01D 21/0084; B01D 24/12; B01D 24/22; B01D 24/44; B01D 24/46; B01D 24/4631; B01D 36/02; B03D 2203/001; B03D 1/1462; Y02W 10/15
USPC ............ 210/222.2, 262, 265, 266, 275, 496
See application file for complete search history.

(56) References Cited

U.S. PATENT DOCUMENTS 3,433,359 A * 3/1969 Lundin et al. ................. 210/199
3,506,125 A * 4/1970 Oldfather et al. ............ 210/776
(Continued)

FOREIGN PATENT DOCUMENTS

GB 2392152 A 2/2004
JP 01-242187 A 9/1989
(Continued)

OTHER PUBLICATIONS

Extended European Search Report dated Jul. 16, 2014, issued in European Patent Application No. 11862310.7.

*Primary Examiner* — Matthew O Savage
(74) *Attorney, Agent, or Firm* — Sughrue Mion, PLLC

(57) ABSTRACT

Disclosed is a dissolved air floatation (DAF)-type pretreatment apparatus. The dissolved air floatation (DAF)-type pretreatment apparatus includes: a floatation tank for removing foreign objects of floating matter, turbid matter, or alga contained in raw water of seawater, sewage, or wastewater; a filtering compartment part provided in the floatation tank and having one surface and the other surface which are partially opened to allow treatment water obtained by primarily removing floating matter from raw water to pass therethrough; and a plurality of filtering balls confined in the filtering compartment part and including a fibrous or spongy material to filter turbid matter or floating or suspended solids remaining in the treatment water introduced to the interior of the filtering compartment part.

9 Claims, 3 Drawing Sheets

(51) Int. Cl.
  *B03D 1/14* (2006.01)
  *B01D 24/46* (2006.01)
  *B01D 24/22* (2006.01)
  *B01D 21/00* (2006.01)
  *C02F 1/52* (2006.01)
  *C02F 3/08* (2006.01)
  *C02F 3/10* (2006.01)
  *C02F 103/08* (2006.01)

(52) U.S. Cl.
  CPC .......... *B01D21/0084* (2013.01); *B01D 24/22* (2013.01); *B01D 24/4631* (2013.01); *B03D 1/1462* (2013.01); *B03D 2203/001* (2013.01); *C02F 1/52* (2013.01); *C02F 3/085* (2013.01); *C02F 3/104* (2013.01); *C02F 2103/08* (2013.01); *C02F 2303/16* (2013.01); *Y02W 10/15* (2015.05)

(56) References Cited

U.S. PATENT DOCUMENTS

| 4,495,074 | A | * | 1/1985 | Hagiwara et al. | 210/695 |
| 5,248,415 | A | * | 9/1993 | Masuda et al. | 210/154 |
| 5,516,434 | A | * | 5/1996 | Cairo et al. | 210/703 |
| 6,383,373 | B1 | | 5/2002 | Nakao et al. | |
| 2004/0256325 | A1 | | 12/2004 | Frankiewicz et al. | |

FOREIGN PATENT DOCUMENTS

| JP | 06182115 A | * | 7/1994 | B01D 24/02 |
| JP | 07-251190 A | | 10/1995 | |
| JP | 10-054067 A | | 2/1998 | |
| JP | 10-156377 A | | 6/1998 | |
| JP | 2000-185293 A | | 7/2000 | |

* cited by examiner

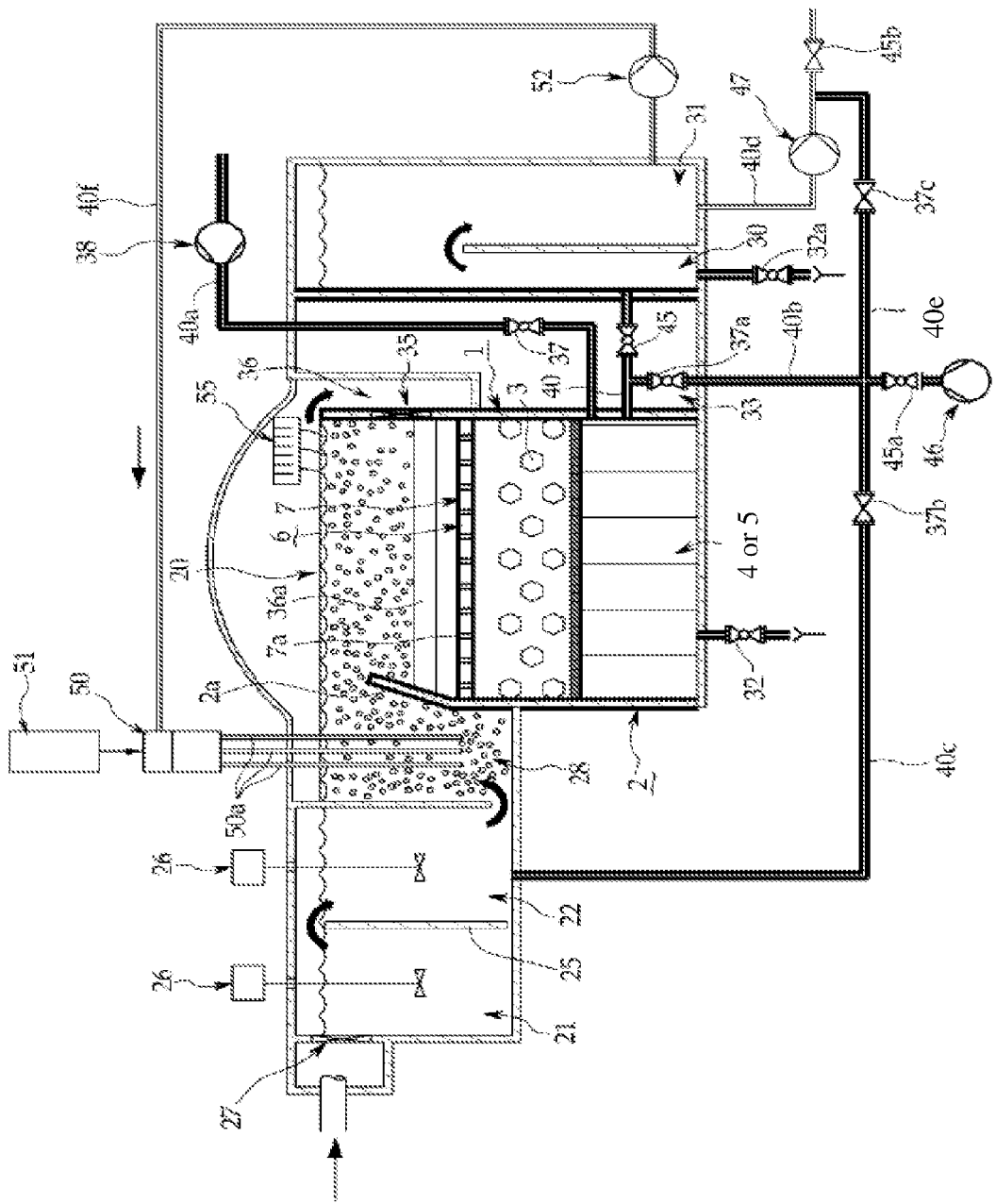

DISSOLVED AIR FLOTATION-TYPE PRETREATMENT APPARATUS

CROSS-REFERENCE TO RELATED APPLICATION

Pursuant to 35 U.S.C. §119(a), this application claims the benefit of earlier filing date and right of priority to PCT No. PCT/KR2011/002068, filed on Mar. 25, 2011, the contents of which is incorporated by reference herein in its entirety.

BACKGROUND OF THE INVENTION

1. Field of the Invention

The present invention relates to a dissolved air floatation (DAF)-type pretreatment apparatus and, more particularly, to a DAF-type pretreatment apparatus capable of removing foreign objects (or foreign materials) such as floating matter, turbid matter (or turbidity solids), alga (or algae), and the like, contained in raw water such as saltwater, sewage, or waste water, and the like.

2. Background of the Invention

In general, in order to remove foreign materials such as floating materials, turbid matter, alga, and the like, contained in raw water such as saltwater, sewage, or waste water, and the like, a related art pretreatment apparatus employs a water treatment method including flocculation-precipitation-filtering processes, flocculation-floating-filtering processes, or the like.

Among the processes, in particular, the floating process is performed as follows.

For example, a related art floatation system includes a reaction tank, a flocculation tank, a floatation tank, a circulation pump, a saturator tank, an air compressor, and the like. Here, a stirrer is installed in the flocculation tank and the reaction tank, respectively, in order to mix foreign objects contained in raw water and a flocculant (or a coagulant) input to (or applied to) raw water to form flocks.

In another example, instead of the reaction tank and the flocculation tank having a stirrer, the related art floatation system may include a hydraulic reaction tank and a flocculation basic which do not require power, a floatation tank, a circulation pump, and the like.

However, in the case of the floatation systems of the two examples, processing capacity of the floatation tank is limited to a particular range, i.e., to a range of 10 to 25 m³/hr, and thus, a larger amount of floatation tanks are required in a large capacity pretreatment process. As a result, a size of the floatation system is required to be increased, and thus, a larger space for the installation of the floatation system is required to be secured.

Also, the related art floatation system is known to be effective to remove floatation material such as alga, or the like. However, since the related art floatation system is not effective to remove suspension solids, it is not used alone. Thus, the related art floatation system is required to perform a precipitation or separation process to remove suspension solids contained in produced treatment water. In the precipitation process, saltwater, sewage, waster water, and the like, is filtered through a gravitation method or a pressure method mainly by using particulate filtration materials such as gravel, sand, anthracite, and the like, but the related art floatation system cannot properly serve as a filter when a large amount of alga such as a red tide, or the like, flows in.

Thus, in order to prevent this, the related art floatation system additionally adopts a DAF process before the precipitation process, configuring a two-stage pretreatment facility. The two-stage pretreatment facility, however, requires an area of a site for a precipitation system to perform a precipitation process, which results in an increase in the cost of construction and operating expenses. In order to solve the problem, a pretreatment process incorporating the floatation process and a sand filtration process has been developed, but it is disadvantageous in that operation performance of the floatation process is limited by the sand filtration process.

In another example, a gravitation-type fiber filter, instead of the foregoing sand filtration process, is installed in a production processing water tank for the floatation process, combining the floatation process and the gravitation-type fiber filtering process into a single process. In this case, however, since the size of the production processing water tank should be increased to install a required amount of gravitation-type fiber filters, the area of a site is disadvantageously required as much.

In addition, the gravitation-type fiber filter has a problem in that when back washing is repeatedly performed, fibers may be easily broken due to a short-term fatigue load and may be entangled to restrain back washing from being properly performed. Also, when fibers of the gravitation-type fiber filter are broken or entangled, the gravitation-type fiber filter should be replaced by a new one frequently, increasing maintenance cost.

SUMMARY OF THE INVENTION

Therefore, an object of the present invention is to provide a dissolved air floatation (DAF)-type pretreatment apparatus occupying a small installation space, properly removing foreign objects such as floating matter, turbid matter, alga, and the like, contained in raw water such as seawater, sewage, waster water, and the like, and facilitating backwashing.

According to an aspect of the present invention, there is provided a dissolved air floatation (DAF)-type pretreatment apparatus including a floatation tank for removing foreign objects of floating matter, turbid matter, or alga contained in raw water of seawater, sewage, or wastewater, including: a filtering compartment part provided in the floatation tank and having one surface and the other surface which are partially opened to allow treatment water obtained by primarily removing floating matter from raw water to pass therethrough; and a plurality of filtering balls confined in the filtering compartment part and including a fibrous or spongy material to filter turbid matter or floating or suspended solids remaining in the treatment water introduced to the interior of the filtering compartment part.

Also, the present invention further provides the following specific embodiments with respect to one embodiment of the present invention.

According to an embodiment of the present invention, a lower portion of the filtering compartment part may include a perforation block part or a strainer part configured to prevent the plurality of filtering balls from being released through the lower portion of the filtering compartment part and support the plurality of filtering balls.

According to an embodiment of the present invention, an upper portion of the filtering compartment part may include a ball loss preventing part configured to prevent the plurality of filtering balls from being released to the outside through the upper portion of the filtering compartment part.

According to an embodiment of the present invention, the ball loss preventing part may be a porous plate.

According to an embodiment of the present invention, one side of an upper portion of the floatation tank may include a back wash water door configured to discharge wastewater generated while the plurality of filtering balls are back-washed, to the outside and a first back wash wastewater tray configured to guide wastewater discharged through the back wash water door to the outside.

According to an embodiment of the present invention, the filtering compartment part may include at least one second back wash wastewater tray installed above the ball loss preventing part with a gap present therebetween and configured to guide back wash wastewater from the filtering compartment part to the back wash water door of the floatation tank.

According to an embodiment of the present invention, the DAF-type pretreatment apparatus may further include: an installation chamber provided between the filtering compartment part and a first water chamber corresponding to a post-treatment of the filtering compartment part, a first treatment water pipe disposed within the installation chamber and connecting the filtering compartment part and the first water chamber, and a flow regulating valve provided in a portion of the first treatment water pipe.

According to an embodiment of the present invention, the DAF-type pretreatment apparatus may further include: an air pipe having one end portion communicating with the filtering compartment part and the other end portion communicating with the atmosphere and disposed to pass through the installation chamber, an air blower coupled to the air pipe in a communicating manner and blowing air to the filtering compartment part through the air pipe, and a back wash valve installed in the air pipe positioned between the filtering compartment part and the air blower.

According to an embodiment of the present invention, the DAF-type pretreatment apparatus may further include: a first back wash water pipe communicating with the first treatment water pipe positioned between the filtering compartment part and the flow regulating valve within the installation chamber, a back wash pump provided in the other end portion of the first back wash water pipe to supply back wash water, a back wash valve provided in the first back wash water pipe positioned within the installation chamber, and a flow regulating valve provided in the first back wash water pipe positioned in the exit of the back wash pump.

According to an embodiment of the present invention, the DAF-type pretreatment apparatus may further include: a second back wash water pipe having one end portion coupled to the reaction tank performing a pretreatment of the floatation tank communicating with the filtering compartment part or the flocculation tank disposed between the reaction tank and the floatation tank in a communicating manner and the other end portion connected to the first back wash water pipe positioned between the flow regulating valve and the back wash valve and connecting the back wash pump, the flow regulating valve, and the back wash valve; and a back wash valve provided in a portion of the second back wash water pipe to control a flow of raw water within the second back wash water pipe.

According to an embodiment of the present invention, the DAF-type pretreatment apparatus may further include: a third back wash water pipe having one end connected to a second treatment water pipe connecting a second water chamber installed to communicate with a first water chamber that performs a post-treatment of the filtering compartment part and a post-treatment of the second water chamber, such that it is coupled to the second treatment water pipe positioned between the treatment water pump and a flow regulating valve, and the other end portion connected to the first back wash water pipe positioned between the flow regulating valve and the back wash valve and connecting the back wash pump, the flow regulating valve, and the back wash valve, in order to allow the filtering compartment part to be back-washed by using treatment water produced through the filtering compartment part; and a back wash valve provided in a portion of the third back wash water pipe to control a flow of raw water within the third back wash water pipe.

According to embodiments of the present invention, the DAF-type pretreatment apparatus including a filtering compartment part and the plurality of filtering balls provided within the filtering compartment part is provided to thereby occupy a small installation space, properly remove foreign objects such as floating matter, turbid matter, alga, and the like, contained in raw water such as seawater, sewage, waster water, and the like, and facilitate back-washing.

According to embodiments of the present invention, the DAF-type pretreatment apparatus including a filtering compartment part and the plurality of filtering balls provided within the filtering compartment part is provided to allow the plurality of filtering balls to be repeatedly used for at least two to three years in consideration of general water quality of raw water.

According to embodiments of the present invention, the DAF-type pretreatment apparatus including a filtering compartment part and the plurality of filtering balls provided within the filtering compartment part is provided, whereby, after back-washing several times, a porous plate of the filtering compartment part can be opened to take the plurality of filtering balls out of the filtering compartment part and be cleaned by using a cleaner, thus increasing reusability of the plurality of filtering balls, and accordingly, since the plurality of filtering balls is rarely replaced, operating expenses can be reduced.

BRIEF DESCRIPTION OF THE DRAWINGS

FIG. 1 is a schematic cross-sectional view of a seawater desalination pretreatment apparatus employing a dissolved air floatation (DAF)-type pretreatment apparatus according to an embodiment of the present invention.

FIG. 2 is a schematic cross-sectional view of a second back-washing waste water tray installed in a filtering compartment part of the DAF-type pretreatment apparatus according to an embodiment of the present invention.

DETAILED DESCRIPTION OF THE INVENTION

Hereinafter, dissolved air floatation (DAF) pretreatment apparatus according to an embodiment of the present invention will be described with reference to FIGS. 1 through 3.

FIG. 1 is a schematic cross-sectional view of a seawater desalination pretreatment apparatus employing a dissolved air floatation (DAF)-type pretreatment apparatus (indicated by the double lines) according to an embodiment of the present invention. FIG. 2 is a schematic cross-sectional view of a second back-washing waste water tray installed in a filtration compartment unit of the DAF-type pretreatment apparatus according to an embodiment of the present invention. FIG. 3 is a schematic view illustrating another example of filtering balls different from one example of filtering balls accommodated in the filtration compartment unit of the DAF-type pretreatment apparatus according to an embodiment of the present invention.

The DAF-type pretreatment apparatus according to an embodiment of the present invention is applied to a seawater desalination pretreatment apparatus as illustrated in FIG. 1 or a floatation tank of a water treatment device (not shown) for purifying sewage, waste water, or the like, in order to remove foreign materials such as floating matter, turbid matter, or alga contained in raw water.

Figure 3:
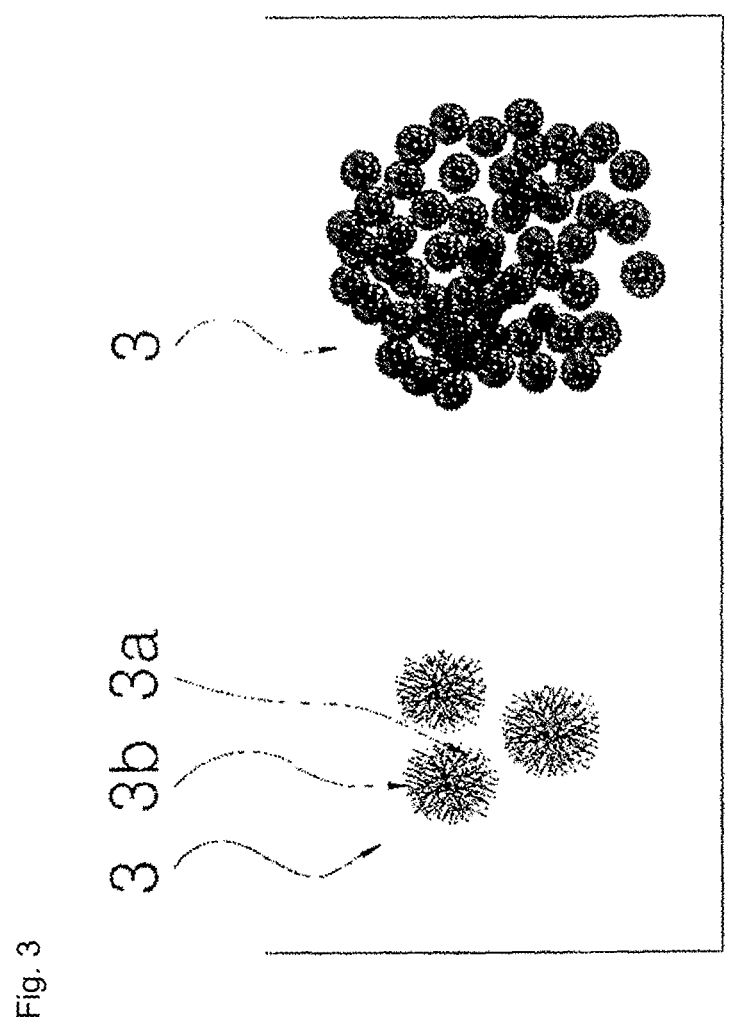
FIG. 3 is a schematic view illustrating another example of filtering balls different from one example of filtering balls accommodated in the filtration compartment unit of the dissolved air floatation pretreatment apparatus according to an embodiment of the present invention.

The DAF-type pretreatment apparatus 1 according to an embodiment of the present invention includes a filtering compartment part 2 provided in the floatation tank 20 and having one surface and the other surface which are partially opened to allow treatment water obtained by primarily removing floating matter from raw water to pass therethrough; and a plurality of filtering balls 3 confined in the filtering compartment part 2 and including fibrous or spongy material to filter turbid matter or floating or suspended solids remaining in the treatment water introduced to the interior of the filtering compartment part 2 (please see FIGS. 1 and 3). The filtering balls 3 may be formed of various materials such as fiber or a sponge material.

FIG. 3 illustrates an example of filtering balls 3 accommodated in the filtering compartment part 2 of the DAF-type pretreatment apparatus according to an embodiment of the present invention. Each of the filtering balls 3 includes, for example, a core member 3a made of an aluminum alloy and having an outer surface coated with a plastic material, and a fibrous material 3b fixedly bound or attached to or wound around on the exterior of the core member 31 and made of polypropylene (PP), polyethylene (PE), or polyvinylidenedifluoride (PVDF), or the like.

The DAF-type pretreatment apparatus 1 occupies a small installation space, facilitates maintenance, properly removes foreign objects such as suspended materials, turbid matter, alga, and the like, contained in seawater, sewage, or wastewater, and the like, and facilitate back-washing.

Also, the DAF-type pretreatment apparatus may be further limited to the following specific embodiments on the basis of the basic configuration as described above.

In an embodiment, a lower portion of the filtering compartment part 2 may include a perforation block part 4 or a strainer part 5 formed in a lower portion thereof to prevent the plurality of filtering balls 3 from being released to the outside through a lower portion of the filtering compartment part 2 and supporting the plurality of filtering balls 3.

The perforation part 4 has a plurality of through holes allowing treatment water purified through the filtering compartment part 2 to pass outwardly therethrough. Also, the strainer part 5 includes a plurality of strainers allowing treatment water purified through the filtering compartment part 2 to pass outwardly therethrough. The perforation block part 4 or the strainer part 5 serves to prevent the plurality of filtering balls 3 from being outwardly released from the filtering compartment part 2 and support the filtering balls 3, and also serves to guide the treatment water purified through the filtering compartment part 2 to a first water chamber 30 of a post-process (please see FIG. 1).

In an embodiment, the filtering compartment part 2 includes a ball loss preventing part 6 formed in an upper portion thereof to prevent the plurality of filtering balls 3 from being released outwardly through the upper portion of the filtering compartment part 2. Here, as illustrated in FIG. 1, the ball loss preventing part 6 may be configured as a porous plate 7 having a plurality of through holes 7a smaller than the filtering balls 3 in size.

In an embodiment, one side of an upper portion of the floatation basin 20 may include a back wash water door 35 discharging waste water, which is generated while the plurality of filtering balls 3 are back-washed, to the outside and a first back wash waste water tray 36 guiding waste water discharged through the back wash water door to the outside.

In this case, an upper end portion of the guide plate 2a corresponding to one side wall of the filtering compartment part 2 facing the back wash water door 35 is formed to be higher than the back wash water door 35 such that raw water or purified treatment water flowing backward from a lower portion of the filtering compartment part 2 to an upper portion thereof while the plurality of filtering balls 3 are back-washed is smoothly guided to the first back wash waste water tray 36. Also, preferably, the guide plate 2a is slightly bent inwardly from the filtering compartment part 2 to allow raw water supplied from the flocculation tank 22 of a pretreatment process of the floatation tank 20 to be smoothly introduced to the filtering compartment part 2 through the floatation tank 20.

The back wash water door/back wash waste water tray structure allows waste water generated when the plurality of filtering balls 3 within the filtering compartment part 2 to be smoothly guided to the first back wash waste water tray 36 through the back wash water door 35 so as to be discharged to the outside by using a difference in water level.

In an embodiment, in the filtering compartment part 2, at least one second back wash waste water tray 36a may be installed to be higher than the ball loss preventing part 6 with a gap therebetween, and guide back wash waste water to the back wash water door 35 of the floatation tank 20 (please see FIG. 1). As illustrated in FIG. 2, the second back wash waste water tray 36a is formed such that both end portions thereof in a width direction are bent upwardly in order to stably guide back wash waste water from the filtering compartment part 2 to the back wash water door 35.

Meanwhile, the DAF-type pretreatment apparatus 1 according to an embodiment of the present invention may further include components in addition to the basic configuration including the filtering compartment part 2 and the plurality of filtering balls 3 confined in the filtering compartment part 2 as described above (please see FIG. 1).

In an embodiment, the DAF-type pretreatment apparatus 1 may include an installation chamber 33 provided between the filtering compartment part 2 and the first water chamber 30 corresponding to a post-treatment of the filtering compartment part 2, a first treatment water pipe 40 disposed within the installation chamber 33 and connecting the filtering compartment part and the first water chamber 30, and a flow regulating valve 45 provided in a portion of the first treatment water pipe 40.

In the structure of the installation chamber as described above, since the flow regulating valve 45 is placed in an indoor area, management and maintenance of the flow regulating valve 45 can be facilitated. As illustrated in FIG. 1, although not shown as a cross-section of the installation chamber 33 is schematically illustrated, a door (not shown) is provided in one side of the installation chamber 33.

In an embodiment, the DAF-type pretreatment apparatus 1 may have a structure further including an air pipe 40a having one end portion communicating with the filtering compartment part 2 and the other end portion communicating with the atmosphere, and installed through the installation chamber 33, an air blower 38 coupled to the air pipe 40*a* in a communicating manner and blowing air to the filtering compartment part 2 through the air pipe 40*a*, and a back washing valve 37 installed in the air pipe 40*a* positioned between the filtering compartment part 2 and the air blower 38 (please see FIG. 1).

According to the structure of the air blower as described above, in a case in which the filtering compartment part 2 is back-washed, the air blower 38 may inject air for back-washing the plurality of filtering balls 3 within the filtering compartment part 2 to the filtering compartment part 2. In this case, the back washing valve 37 may be opened for the operation of the air blower 38.

In an embodiment, the DAF-type pretreatment apparatus 1 may have a structure further including a first back wash water pipe 40*b* having one end portion communicating with the first treatment water pipe 40 positioned between the filtering compartment part 2 and the flow regulating valve 45 within the installation chamber 33, a back wash pump 46 provided in the other end portion of the first back wash water pipe 40*b* to supply back wash water, a back wash valve 37*a* provided in the first back wash pipe 40*b* positioned within the installation chamber 33, and a flow regulating valve 45*a* provided in the first back wash water pipe 40*b* positioned in an exit of the back wash pump 46 (please see FIG. 1). The back wash pump 46 may back-wash the plurality of filtering balls 3 within the filtering compartment part 2 by using the raw water within the floatation tank 20 or by using a partial amount of the treatment water produced through the filtering compartment part 2.

According to the back wash structure using the back wash pump, in case of back-washing the filtering compartment part 2, the back wash pump 46 may be able to supply back wash water for back-washing the plurality of filtering balls 3 within the filtering compartment part 2 to the filtering compartment part 2. In this case, for the operation of the back wash pump 46, the flow regulating valve 45 controlling a flow of produced treatment water within the installation chamber 33 is closed and the back wash valve 37*a* and the flow regulating valve 45*a* provided in the first back wash water pipe 40*b* connected to the back wash pump 46 are opened.

Figure 4:
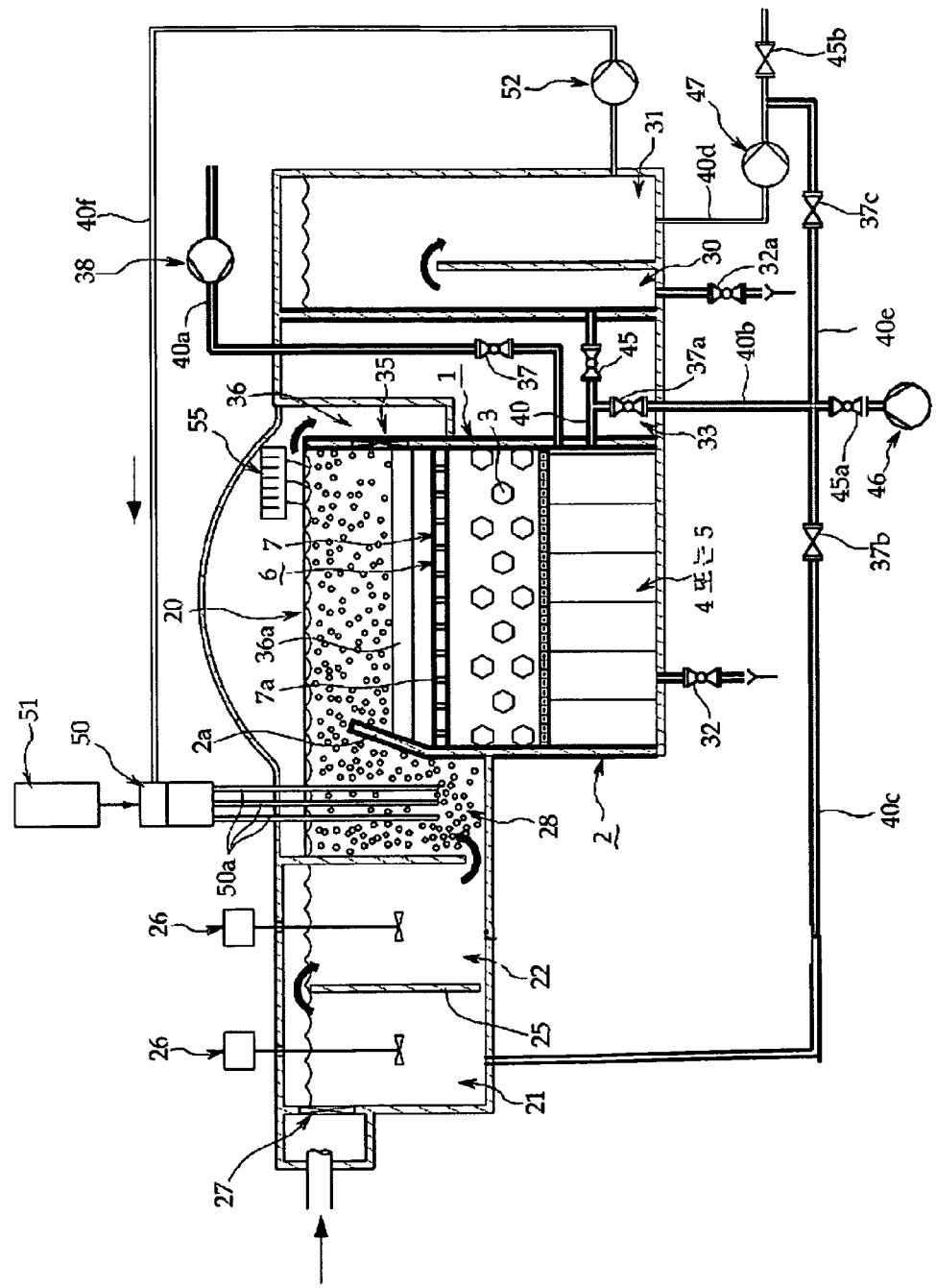
FIG. 4 is a schematic cross-sectional view of a seawater desalination pretreatment apparatus employing a dissolved air floatation (DAF)-type pretreatment apparatus according to another embodiment.

In an embodiment (FIG. 4), the DAF-type pretreatment apparatus 1 may have a structure further including a second back wash water pipe 40*c* having one end portion coupled to the reaction tank 21 performing a pretreatment of the floatation tank 20 communicating with the filtering compartment part 2 or the flocculation tank 22 disposed between the reaction tank 21 and the floatation tank 20 in a communicating manner and the other end portion connected to the first back wash water pipe 40*b* positioned between the flow regulating valve 45*a* and the back wash valve 37*a* and connecting the back wash pump 46, the flow regulating valve 45*a*, and the back wash valve 37*a*, and a back wash valve 37*b* provided in a portion of the second back wash water pipe 40*c* to control a flow of raw water within the second back wash water pipe 40*c*.

According to the back wash structure using raw water within the reaction tank 21 or the flocculation tank 22, in case of back-washing the filtering compartment part 2, the back wash valve 37*b* allows for supplying back wash water for back-washing the plurality of filtering balls 3 within the filtering compartment part 2 from the reaction tank 21 or the flocculation tank 22 to the interior of the filtering compartment part 2. In this case, the flow regulating valve 45*a* at the exit side of the back wash pump 46 and the flow regulating valve 45 controlling a flow of produced treatment water within the installation chamber 33 are closed, and the back wash valve 37*a* provided in the first back wash water pipe 40*b* connected to the back wash pump 46 is opened.

In an embodiment, the DAF-type pretreatment apparatus 1 may have a structure further including a third back wash water pipe 40*e* having one end connected to a second treatment water pipe 40*d* connecting a second water chamber 31 installed to communicate with a first water chamber 30 that performs a post-treatment of the filtering compartment part 2 and a post-treatment of the second water chamber 31, such that it is coupled to the second treatment water pipe 40*d* positioned between the treatment water pump 47 and a flow regulating valve 45*b*, and the other end portion connected to the first back wash water pipe 40*b* positioned between the flow regulating valve 45*a* and the back wash valve 37*a* and connecting the back wash pump 46, the flow regulating valve 45*a*, and the back wash valve 37*a*, in order to allow the filtering compartment part 2 to be back-washed by using treatment water produced through the filtering compartment part 2, and a back wash valve 37*c* provided in a portion of the third back wash water pipe 40*e* to control a flow of raw water within the third back wash water pipe (please see FIG. 1).

According to the back wash structure using produced treatment water guided to a post-treatment of the second water chamber 31, in a case of back-washing the filtering compartment part 2, the back wash valve 37*c* may supply back wash water for back-washing the plurality of filtering balls 3 within the filtering compartment part 2 to the interior of the filtering compartment part 2. At this time, the flow regulating valve 45 within the installation chamber 33 may be opened to operate the treatment water pump 47 and the flow regulating valve 45*b* controlling a flow of treatment water flowing to a post-treatment through the treatment water pump is closed. Also, the back wash valve 37*b* controlling a flow of raw water flowing from the reaction tank 21 or the flocculation tank 22 to the filtering compartment part 2 and the flow regulating valve 45*a* at the exit side of the back wash pump 46 are closed, and the back wash valve 37*a* of the first back wash water pipe 40*b* connected to the back wash pump 46 is opened.

Meanwhile, the DAF-type pretreatment apparatus 1 (portions indicated by the double lines) according to an embodiment of the present invention configured as described above may be installed within the floatation tank 20 of the seawater desalination pretreatment apparatus as an example illustrated in FIG. 1, independently, or in a state in which it shares a portion (or a side wall) of the floatation tank 20.

As illustrated in FIG. 1, the seawater desalination pretreatment apparatus 1 includes the reaction tank 21 and the flocculation tank 22 provided in front of the floatation tank 20, and includes the first water chamber 30 and the second water chamber 31 behind the floatation tank 20. Also, preferably, a drain valve 32 is provided below the filtering compartment part 2 of the seawater desalination pretreatment apparatus 1 to easily lower a water level within the filtering compartment part 2 in the event of a back-wash operation. Also, a drain valve 32*a* is provided below the first water chamber 30 in order to discharge remnants in case of cleaning the first water chamber 30. The second water chamber 31 is connected to an input part of the post-treatment by the medium of the first and second treatment water pipes 40 and 40*d* in order to guide purified treatment water to a post-treatment for desalinating seawater. Also, the treatment water pump 47 as mentioned above is installed in a portion of the second treatment water pipe 40d, and the treatment water pump 47 guides purified treatment water to the input part of the post-treatment process or a portion of the pre-treatment process. Also, the flow regulating valve 45b as mentioned above is installed in a portion of the second treatment water pipe 40d between the treatment water pump 47 and the input part of the post-treatment. The flow regulating valve 45b controls a flow of purified treatment water flowing along the second treatment water pipe 40d.

The DAF-type pretreatment apparatus 1 according to an embodiment of the present invention is provided below the floatation tank 20.

Here, as illustrated in FIG. 1, the reaction tank 21 and the flocculation tank 22 are partitioned by the medium of a partition wall 25 and communicate through upper and lower portions of the partition wall 25. The reaction tank 21 and the flocculation tank 22 include a stirrer 26, respectively, and a water gate 27 is provided in a front side wall of the reaction tank 21 to receive raw water from the outside. The respective stirrers 26 of the reaction tank 21 and the flocculation tank 22 mix foreign objects included in raw water and a flocculant applied to the raw water to form blocks.

In an upper portion of a mixing tank 28 corresponding to a compartment between a side wall of the floatation tank 20 and a corresponding side wall of the filtering compartment part 2, a saturator tank 50 having nozzles 50a with a lower end portion immersed within the mixing tank 28 is installed to generate fine bubbles in the raw water within the mixing tank 28. One side of the saturator tank 50 is connected to an air compressor 51 to receive compressed air, and the other side thereof is connected to a circulation pump 52 in order to provide a partial amount of purified treatment water within the second water chamber 31 to the saturator tank 50 by the medium of the third treatment water pipe 40f through the circulation pump 52.

Fine bubbles provided from the nozzles 50a of the saturator tank 50 cling to flocks in the raw water introduced from the flocculation tank 22 to the mixing tank 28, and the flocks with the fine bubbles adhered thereto float in the upper portion of the floatation tank 20. Thus, a skimmer 55 is installed above the floatation tank 20 in order to skim flocks with fine bubbles adhered thereto so that the blocks can be discharged to the outside.

An operation in a case in which the DAF-type pretreatment apparatus (portions indicated by the double lines) according to an embodiment of the present invention configured as described above is applied to the seawater desalination pretreatment apparatus as an example illustrated in FIG. 1 will be described with reference to FIGS. 1 through 3.

First, when raw water of seawater to which a flocculant was input thereto is introduced into the reaction tank 21 through the water gate 27 of the reaction tank 21, or when a flocculant is applied to the reaction tank 21 immediately when raw water of seawater is introduced into the reaction tank 21, the stirrer 26 installed above the reaction tank 21 may be operated to mix foreign objects contained in the raw water and the flocculant.

Next, when the raw water is introduced to the flocculation tank 22 contiguous to the reaction tank 21 through the upper portion and/or the lower portion of the reaction tank 21, the stirrer 26 installed above the flocculation tank 22 is operated and flocks are formed according to a flocculation operation between the foreign objects contained in the raw water and the flocculant.

Subsequently, when the raw water and the flocks are introduced to the mixing tank 28 contiguous to the flocculation tank 22 through the lower portion of the flocculation tank 22, circulation water having high pressure (approximately 3 to 7 bar) is supplied from the saturator tank 50 installed above the mixing tank 28 to the mixing tank 28 through the nozzles 50a. The circulation water has a gas such as air, or the like, dissolved therein, and when such a gas is jetted to the mixing tank 28 through the nozzles 50a, the gas such as air, or the like, dissolved in the circulation water generates fine bubbles. The fine bubbles cling to the flocks. Then, the flocks float on an upper portion of the floatation tank 20 contiguous to the mixing tank 28, and skimmed by the skimmer 55 installed above the floatation tank 20 so as to be discharged to the outside.

Thereafter, the first purified raw water within the floatation tank 20 passes through a gap between the second back wash waste water tray 36a provided in an upper portion of the filtering compartment part 2 and the floatation tank 20 or a gap between the second back wash waste water trays (in a case in which two or more second back wash waste water trays are provided) so as to be introduced to the filtering compartment part 2 through the through holes 7a of the porous plate 7 as a ball loss preventing part 6, and passes through the plurality of filtering balls 3 and the perforation block part 4 or the strainer part 5 provided in a lower portion of the filtering compartment part 2 so as to be introduced to the first water chamber 30 through the first treatment water pipe 40 and the flow regulating valve 45 within the installation chamber 33.

At this time, turbid matter or floating and suspended solids remaining in the raw water introduced to the filtering compartment part 2 cling to the plurality of filtering balls 3 provided within the filtering compartment part 2 so as to be separated from the raw water, and thus, only purified treatment water passes through the perforation block part 4 or the strainer part 5 provided in a lower portion of the filtering compartment part 2 and is introduced to the first water chamber 30 through the treatment water pipe 40 and the flow regulating valve 45.

Subsequently, the purified treatment water introduced to the first water chamber 30 flows into the second water chamber 31 contiguous to the first water chamber 30, and the purified treatment water introduced to the second water chamber 31 is provided to the input part of a post-treatment process for desalinating seawater through the treatment water pump 47 and the flow regulating valve 45b provided in the exit of the treatment water pump 47.

Meanwhile, cases in which the plurality of filtering balls 3 within the filtering compartment part 2 are back-washed due to long-time use of the DAF-type pretreatment apparatus 1 according to three embodiments of the present invention will be described.

In a first embodiment, first, the water gate 27 of the reaction tank 21 and the flow regulating valve 45 within the installation chamber 33 provided between the first water chamber 30 and the filtering compartment part 2 are closed, and thereafter, the drain valve 32 connected to a lower portion of the filtering compartment part 2 is opened to lower a water level within the floatation tank 20 such that it is lower than an upper end portion of the guide plate 2a of the filtering compartment part 2. Then, the water level within the reaction tank 21 or the flocculation tank 22 is higher than that within the floatation tank 20.

Thereafter, the drain valve 32 disposed in the lower portion of the filtering compartment part 2 is closed, the back wash water door 35 provided in one side of an upper portion of the floatation tank 20 is opened, the flow regulating valve 45a provided in the first back wash water pipe 40b at the exit of the back wash pump 46 and the back wash valve 37a of the first back wash water pipe 40b connected to the first treatment water pipe 40 at the entrance of the flow regulating valve 45 within the installation chamber 33 are opened, respectively, and the back wash valve 37 provided in the air pipe 40a at the exit of the air blower 38 is opened.

Thereafter, when the back wash pump 46 and the air blower 38 are operated, respectively, the back wash pump 46 supplies the raw water supplied from any one of the reaction tank 21 and the flocculation tank 22 or the treatment water produced through the filtering compartment part 2 and air supplied through the air blower 38 to the interior of the filtering compartment part 2 through the perforation block part 4 or the strainer part 5 provided in a lower portion of the filtering compartment part 2, simultaneously or sequentially.

Then, the plurality of filtering balls 3 within the filtering compartment part 2 are moved and foreign objects such as turbid matter or floating and suspended solids, and the like, adhered to the plurality of filtering balls 3 are separated or released from the plurality of filtering balls 3. Also, during the back washing process, the foreign objects such as the turbid matter or floating or suspended solids, and the like, separated from the plurality of filtering balls 3 are discharged to the first back wash waste water tray 36 through the upper ball loss preventing part 6 of the filtering compartment part 2 and the back wash water door 35 or through the second back wash waste water tray 36a and the back wash water door 35.

Thereafter, when the back-washing process is completed, the foregoing back-washing related facility is returned to an initial state, the back wash door 35 is closed, and the water door 27 installed in front of the reaction tank 21 is opened to normally filter raw water. At this time, the drain valve 32a connected to a lower portion of the first water chamber 30 is opened for a predetermined period of time at an initial stage to discharge treatment water passing through the filtering compartment part 2, and when treatment water having clean water quality is produced, the DAF-type apparatus is normally actuated.

In a second embodiment, first, the water gate 27 of the reaction tank 21, the flow regulating valve 45 within the installation chamber 33 provided between the first water chamber 30 and the filtering compartment part 2, and the back wash valve 37a within the installation chamber 33 according to the first embodiment are closed, respectively, and the drain valve 32 connected to a lower portion of the filtering compartment part 2 is opened to lower a water level within the floatation tank 20 such that it is lower than the upper end portion of the guide plate 2a of the filtering compartment part 2. Then, the water level within the reaction tank 21 or the flocculation tank 22 is higher than that within the floatation tank 20.

Thereafter, the drain valve 32 disposed under the filtering compartment part 2, the flow regulating valve 45a at the exit of the back wash pump 46 according to the first embodiment, and the flow regulating valve 45 provided in the first treatment water pipe 40 guiding produced treatment water within the installation chamber 33 are closed, respectively, and the back wash water door 35 provided in one side of the upper portion of the floatation tank 20 and the back wash valve 37 provided in the air pipe 40a at the exit of the air blower 38 are opened.

Thereafter, any one of the reaction tank 21 and the flocculation tank 22 and the back wash valve 37b of the second back wash water pipe 40c communicating a lower portion of the filtering compartment part 2 through the first back wash water pipe 40b according to the first embodiment are opened, and the air blower 38 communicating with the lower portion of the filtering compartment part 2 is operated to supply raw water provided due to a difference in water pressure from any one of the reaction tank 21 and the flocculation tank 22 and air supplied through the air blower 38 to the interior of the filtering compartment part 2 through the perforation block part 4 or the strainer part 5 provided in a lower portion of the filtering compartment part 2 simultaneously or sequentially.

Then, the plurality of filtering balls 3 within the filtering compartment part 2 are moved and foreign objects such as turbid matter or floating or suspended solids, and the like, adhered to the plurality of filtering balls 3 are separated from released from the filtering balls 3. Also, the foreign objects such as the turbid matter or floating or suspended solids, and the like, separated from the plurality of filtering balls 3 are discharged to the first back wash waste water tray 36 through the during the back washing process are discharged to the first back wash waste water tray 36 through the upper ball loss preventing part 6 of the filtering compartment part 2 and the back wash water door 35, or through the second back wash waste water tray 36a and the back wash water door 35.

Thereafter, when the back-washing process is completed, the foregoing back-washing related facility is returned to an initial state, the back wash door 35 is closed, and the water door 27 installed in front of the reaction tank 21 is opened to normally filter raw water. At this time, the drain valve 32a connected to a lower portion of the first water chamber 30 is opened for a predetermined period of time at an initial stage to discharge treatment water passing through the filtering compartment part 2, and when treatment water having clean water quality is produced, the DAF-type apparatus is normally actuated.

In a third embodiment, first, the water gate 27 of the reaction tank 21, the flow regulating valve 45 within the installation chamber 33 provided between the filtering compartment part 2 and the first water chamber 30, the flow regulating valve 45a of the first embodiment, and the back wash valve 37b of the second embodiment are closed, respectively, and the drain valve 32 connected to a lower portion of the filtering compartment part 2 is opened to lower a water level within the floatation tank 20 such that it is lower than the upper end portion of the guide plate 2a of the filtering compartment part 2. Then, the water level within the reaction tank 21 or the flocculation tank 22 is higher than that within the floatation tank 20.

Thereafter, the drain valve 32 disposed under the filtering compartment part 2, the flow regulating value 45b at the exit of the treatment water pump 47 previously installed in the second treatment water pipe 40d communicating with the second water chamber 31 corresponding to a post-treatment of the filtering compartment part 2, the flow regulating valve 45a at the exit of the back wash pump 46 according to the first embodiment, and the back wash valve 37b provided in the second back wash water piper 40c according to the second embodiment are closed, respectively, the back wash water door 35 provided in one side of an upper portion of the floatation tank 20 is opened, and the treatment water pump 47 is operated to supply the produced treatment water supplied through the treatment water pump 47 and air supplied through the air blower 38 to the interior of the filtering compartment part 2 through the perforation block part 4 or the strainer part 5 provided in a lower portion of the filtering compartment part 2 simultaneously or sequentially.

Then, the plurality of filtering balls 3 within the filtering compartment part 2 are moved by the back wash treatment water introduced into the filtering compartment part 2 and foreign objects such as turbid matter or floating or suspended solids, and the like, adhered to the plurality of filtering balls 3 are separated from released from the filtering balls 3. Also, the foreign objects such as the turbid matter or floating or suspended solids, and the like, separated from the plurality of filtering balls 3 are discharged to the first back wash waste water tray 36 through the during the back washing process are discharged to the first back wash waste water tray 36 through the upper ball loss preventing part 6 of the filtering compartment part 2 and the back wash water door 35, or through the second back wash waste water tray 36a and the back wash water door 35.

Thereafter, when the back-washing process is completed, the foregoing back-washing related facility is returned to an initial state, the back wash door 35 is closed, and the water door 27 installed in front of the reaction tank 21 is opened to normally filter raw water. At this time, the drain valve 32a connected to a lower portion of the first water chamber 30 is opened for a predetermined period of time at an initial stage to discharge treatment water passing through the filtering compartment part 2, and when treatment water having clean water quality is produced, the DAF-type apparatus is normally actuated .

The present invention as described above is not limited by the foregoing embodiments and accompanying drawings and simple replacement, modification and alteration within the technical concept of the present invention is obvious to a person skilled in the art.

What is claimed is:

1. A dissolved air floatation (DAF)-type pretreatment apparatus comprising:
    a floatation tank;
    a filtering compartment part disposed below the floatation tank, wherein treatment water obtained by primarily removing floating matter from raw water in the floatation tank is allowed to pass from the floatation tank into an interior of the filtering compartment part; and
    a plurality of filtering balls confined in the filtering compartment part and including a fibrous or spongy material to filter turbid matter or floating or suspended solids remaining in the treatment water introduced to the interior of the filtering compartment part during a filtration mode,
    wherein an upper portion of the floatation tank comprises a back wash water door and a first back wash wastewater tray configured to discharge wastewater generated during a backwashing mode,
    wherein the first back wash wastewater tray is configured to guide wastewater discharged through the back wash water door to the outside,
    wherein the filtering compartment part comprises at least one second back wash wastewater tray oriented horizontally and installed above the ball loss preventing part with a gap present therebetween and configured to guide back wash wastewater from the filtering compartment part to the back wash water door of the floatation tank during the backwashing mode.

2. The DAF-type pretreatment apparatus of claim 1, wherein a lower portion of the filtering compartment part comprises a strainer part configured to prevent the plurality of filtering balls from being released through the lower portion of the filtering compartment part and to support the plurality of filtering balls during the filtration mode.

3. The DAF-type pretreatment apparatus of claim 1, wherein an upper portion of the filtering compartment part comprises a ball loss preventing part configured to prevent the plurality of filtering balls from being released to the outside through the upper portion of the filtering compartment part.

4. The DAF-type pretreatment apparatus of claim 3, wherein the ball loss preventing part is a porous plate.

5. The DAF-type pretreatment apparatus of claim 1, further comprising:
    an installation chamber defined by partition walls;
    a first water chamber disposed downstream of the filtering compartment part, the first water chamber defined by partition walls, wherein the installation chamber is disposed between the filtering compartment part and the first water chamber;
    a first treatment water pipe disposed within the installation chamber and connecting the filtering compartment part and the first water chamber; and
    a flow regulating valve provided in a portion of the first treatment water pipe.

6. The DAF-type pretreatment apparatus of claim 5, further comprising an air pipe having one end portion communicating with the filtering compartment part and the other end portion communicating with the atmosphere and disposed to pass through the installation chamber, an air blower coupled to the air pipe in a communicating manner and blowing air to the filtering compartment part through the air pipe, and a back wash valve installed in the air pipe positioned between the filtering compartment part and the air blower.

7. The DAF-type pretreatment apparatus of claim 5, further comprising:
    a first back wash water pipe having one end communicating with the first treatment water pipe at a point between the filtering compartment part and the flow regulating valve within the installation chamber,
    a back wash pump provided in an other end portion of the first back wash water pipe to supply back wash water,
    a back wash valve provided in the first back wash water pipe positioned within the installation chamber, and
    a flow regulating valve provided in the first back wash water pipe positioned in the exit of the back wash pump.

8. The DAF-type pretreatment apparatus of claim 7, further comprising:
    a reaction tank and a flocculation tank for performing pretreatment to the raw water before the raw water flows into the floatation tank, and
    a second back wash water pipe having one end portion coupled to one of the reaction tank or the flocculation tank and an other end portion of the second back wash water pipe connected to the first back wash water pipe at a point between the flow regulating valve and the back wash valve; and
    a back wash valve provided in a portion of the second back wash water pipe to control a flow of the raw water within the second back wash water pipe.

9. The DAF-type pretreatment apparatus of claim 7, further comprising:
    a second water chamber diposed downsream of the filtering compartment part, the second water chamber defined by partition walls;
    a second treatment water pipe having a treatment water pump and a flow regulating valve, the second treatment pipe having one end connected to the second water chamber;

a third back wash water pipe having one end connected to the second treatment water pipe at a point between the treatment water pump and the flow regulating valve of the second treatment water pipe, and an other end portion connected to the first back wash water pipe at a point between the flow regulating valve of the first back wash water pipe and the back wash valve, in order to allow the filtering compartment part to be back-washed by using treatment water produced through the filtering compartment part; and a back wash valve provided in a portion of the third back wash water pipe to control a flow of raw water within the third back wash water pipe.

* * * * *